(12) United States Patent
Hallenstål et al.

(10) Patent No.: US 8,094,652 B2
(45) Date of Patent: Jan. 10, 2012

(54) METHOD AND APPARATUS FOR PROVIDING CIRCUIT SWITCHED DOMAIN SERVICES OVER A PACKET SWITCHED NETWORK

(75) Inventors: Magnus Hallenstål, Täby (SE); Jari Tapio Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 391 days.

(21) Appl. No.: 12/522,403

(22) PCT Filed: Jan. 14, 2008

(86) PCT No.: PCT/IB2008/000075
§ 371 (c)(1),
(2), (4) Date: Jul. 8, 2009

(87) PCT Pub. No.: WO2008/087521
PCT Pub. Date: Jul. 24, 2008

(65) Prior Publication Data
US 2010/0097990 A1    Apr. 22, 2010

Related U.S. Application Data

(60) Provisional application No. 60/884,914, filed on Jan. 15, 2007.

(51) Int. Cl.
*H04L 12/66* (2006.01)
*H04W 36/00* (2009.01)
(52) U.S. Cl. .................... 370/356; 370/352; 455/436
(58) Field of Classification Search .............. None
See application file for complete search history.

(56) References Cited

U.S. PATENT DOCUMENTS

| | | | | |
|---|---|---|---|---|
| 2003/0027569 | A1* | 2/2003 | Ejzak | 455/432 |
| 2005/0002407 | A1* | 1/2005 | Shaheen et al. | 370/401 |
| 2005/0003819 | A1* | 1/2005 | Wu | 455/436 |
| 2008/0037515 | A1* | 2/2008 | Sander | 370/352 |
| 2010/0172336 | A1* | 7/2010 | Pehrsson et al. | 370/338 |
| 2010/0195616 | A1* | 8/2010 | Vikberg et al. | 370/331 |
| 2010/0208624 | A1* | 8/2010 | Vikberg et al. | 370/259 |
| 2010/0246530 | A1* | 9/2010 | Pehrsson et al. | 370/331 |
| 2010/0254313 | A1* | 10/2010 | Hallenstal et al. | 370/328 |
| 2010/0265884 | A1* | 10/2010 | Vikberg et al. | 370/328 |
| 2010/0303007 | A1* | 12/2010 | Witzel et al. | 370/328 |

OTHER PUBLICATIONS

"3GPP TS43.318 V7.0.0 Generic access to the A/Gb interface" 3rd Generation Partnership Project (3GPP); Technical Specification, [Online] Nov. 2006, XP002481485 Retrieved from the Internet: URL: http://www.3gpp.org/ftp/Specs/html-info/43318.htm>[retrieved on May 26, 2008] Sections 4,5,6.1,7.3.1,7.3.2,8.1,8.3,8.4.1.5,8.9.2.8.10,8.11,8.13.

(Continued)

*Primary Examiner* — Robert Scheibel
*Assistant Examiner* — Hicham Foud

(57) ABSTRACT

A method and Packet Mobile Switching Center (PMSC) for providing MSC-based services over a packet-switched network. An interface between a mobile station and the PMSC is used to transfer control plane and user plane information between the mobile station and the PMSC over the packet-switched network. In one embodiment, the PMSC includes a network controller for handling control plane information from a packet-switched core network and an interworking unit for handling user plane information from the packet-switched core network.

11 Claims, 7 Drawing Sheets

OTHER PUBLICATIONS

"Digital cellular telecommunications system (Phase 2+) (GSM); Universal Mobile Telecommunications System (UMTS); Network architecture (3GPP TS 23.002 version 4.2.0 Release 4); ETSI TS 123 002" ETSI Standards, LIS, vol. 3-SA2, No. V4.2.0, Apr. 1, 2001, XP014007352 ISSN: 0000-0001 Section 4.1.2.1 Entities of CS-domain.

"Universal Mobile Telecommunications System (UMTS); Feasibility study for transport and control separation in the PS CN domain (3GPP TR 23.873 version 4.0.0 Release 4); ETSI TR 123 813" ETSI Standards, LIS, vol. 3-SA2, No. V4.0.0, Mar. 1, 2001, XP014015710 ISSN: 0000-0001 Section 6 Alternative 1: SGSN server—PS Media Gateway Approach.

"3GPP TR23.882 V1.6.1 3GPP System Architecture Evolution: Report on Technical Options and Conclusions" $3^{rd}$ Generation Partnership Project (3GPP): Technical Report, [Online] Nov. 2006, XP002481486 Retrieved from the Internet: URL:http://www.3gpp.org/ftp/Specs/html-info/23882.htm> [retrieved on May 26, 2008) Sections 4.2, 5,7.1, 7.5.2.1.1, 7.5.2.2.1, 7.11.1, 7.11.2.1, 7.12.1,7.12.2,7.12.3,7.12.9, Annex H.6.

Digital cellular telecommunications system (Phase 2+); Enhanced Generic Access Hetworks (EGAN) study (3GPP TR 43.902 version 7.0.1 Release 7): ETSI TR 143 902 ETSI Standards, LIS, vol. 3-G1, No. V7.0.1, Oct. 1, 2007, XP014039742 ISSN: 0000-0001 p. 62-p. 117 Section 5.2 GAN Iu Mode.

3GPP TR23.879 v1.0.0 Study on Circuit Switched (CS) domain services over evolved Packet Switched (PS) access $3^{rd}$ Generation Partnership Project (3GPP); Technical Report, [Online] Dec. 2007, XP002481487 Retrieved from the Internet: URL: http://www.3gpp.org/ftp/Specs/html-info/23879.htm> [retrieved on May 26, 2008) Section 5.1 Alternative 1-Evolved MSC p. 8-p.18.

$3^{rd}$ Generation Partnership Project; "Technical Specification Group Services and System Aspects; Policy and charging control architecture; (Release 7); 3GPP TS 23.203" 3rd Generation Partnership Project (3GPP); Technicalspecification (TS), XX. XX. vol. 23.203. No. v7.1.0, Dec. 1, 2006, pp. 1-35, XP002457540 Sections 4.3. 6.1.5. 6.2.1. 7.2, 7.4 Annex A. D.2.

* cited by examiner

METHOD AND APPARATUS FOR PROVIDING CIRCUIT SWITCHED DOMAIN SERVICES OVER A PACKET SWITCHED NETWORK

CROSS-REFERENCE TO RELATED APPLICATIONS

This application claims the benefit of U.S. Provisional Application No. 60/884,914 filed Jan. 15, 2007, the disclosure of which is incorporated herein by reference.

BACKGROUND OF THE INVENTION

The present invention relates to circuit switched domain services. More particularly, the present invention relates to providing circuit switched (CS) domain services over a packet switched (PS) network.

When introducing LTE (Long Term Evolution)—the next generation radio access in 3GPP—there are only packet bearers available. This means that the wide range of services currently offered within the CS domain can not be used by a terminal using LTE-connectivity, unless the terminal either shifts to another radio access or is equipped with a second transceiver permitting parallel access to the CS-domain present in 2G and 3G networks. Examples of existing services are:

Prepaid
Regularity equipments for identity signaling
Legal interception
0800 calls, free calls
Announcements
Premium number calls
Home Zone
Sound Logo
Call Barrings
MultiSIM
Standardized supplementary services The basic assumption when introducing LTE is that the telecommunication service will be provided by the IMS (IP Multimedia Subsystem) system.

BRIEF SUMMARY OF THE INVENTION

The present invention generally describes a method and apparatus for providing mobile switching center based CS domain services over a packet switched network. In one embodiment, an interface between a mobile station and a packet mobile switching center is provided. The interface is used to transfer control plane information and user plane information between the mobile station and the packet mobile switching center over the packet switched network.

A packet mobile switching center for a circuit switched network is described. In one embodiment, a network controller handles control plane information from a packet switched core network and an interworking unit handles user plane information from the packet switched core network.

BRIEF DESCRIPTION OF THE DRAWINGS

In the following section, the invention will be described with reference to exemplary embodiments illustrated in the figures, in which.

DETAILED DESCRIPTION OF THE INVENTION

Figure 1:
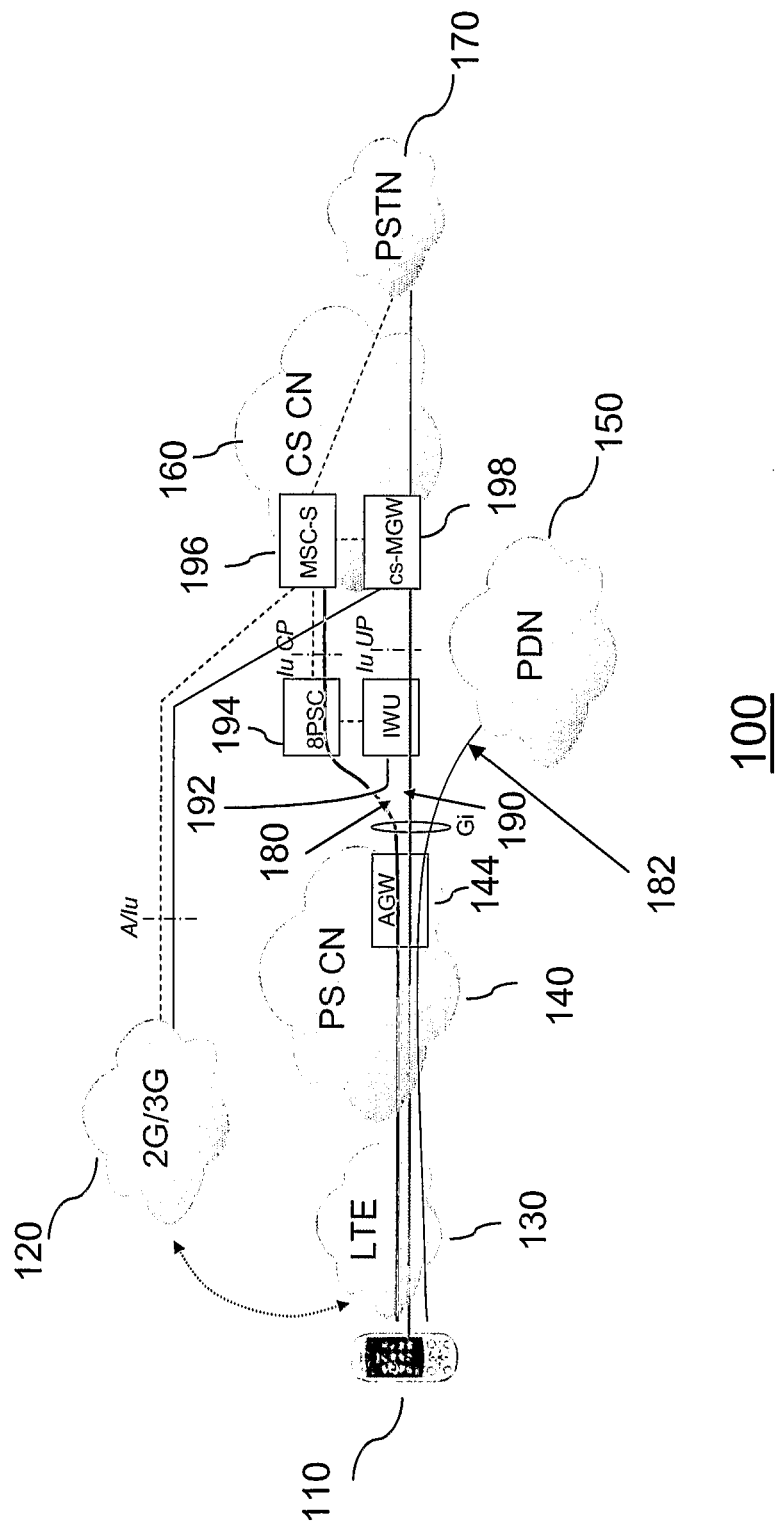
FIG. 1 illustrates a system for providing circuit switched domain services over a packet switched network according to one embodiment of the present invention.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

For the purposes of the present invention, the following terms and definitions apply:

24.008 over 3GPP PS network: A service which allows a terminal to make use of the CS call control also over a 3GPP packet switched network.

24.008 over 3GPP PS network Mode: MS mode of operation where the NAS layers communicate through the U8-CSR entity.

24.008 over 3GPP PS network PMSC: The target MSC, or rather PMSC when handing over from CS domain to packet domain entering the 24.008 over 3GPP PS network Mode.

24.008 over 3GPP PS network supporting PMSC: The PMCS that a MS will rove into when entering the 24.008 over 3GPP PS network Mode.

3GPP PS network: Radio and core part of the 3GPP Packet Switched service.

CS Domain: The domain where Circuit Switched services are executed. This domain can be based on IP in the core network, but on the radio access the resources are circuit based.

CS Domain mode: MS mode of operation where the CS related NAS layers communicate through either the GERAN RR or the UTRAN RRC entities, thus operating in the normal CS Domain. When GERAN RR is used, the BSS is connected to the CN using the standardized A-interface. When UTRAN RRC is used, the RNS is connected to the CN using the standardized Iu-CS interface.

Discovery procedure: The process by which the MS discovers which PMSC to Rove into.

Handover: Mobile station engaged in a call moves between 3GPP CS access networks and 24.008 over 3GPP PS networks.

Handover in: mobile station moves from 3GPP CS access network to 24.008 over 3GPP PS network Handover out: mobile station moves from 24.008 over 3GPP PS network to 3GPP CS access network PMSC: Packet MSC, the network function needed to support the 24.008 over 3GPP PS network service.

Supporting PMSC: The PMSC the MS Roves into

Rove in: mobile station reselects from 3GPP CS access network to 24.008 over 3GPP PS network Rove out: mobile station reselects from 24.008 over 3GPP PS network to 3GPP CS access networks Roving: action of re-selection between 3GPP CS access and 24.008 over 3GPP PS network for a mobile station in idle mode Seamless: free from noticeable transitions (i.e. no end-user action is required; speech interruptions are short; service interruptions are short; incoming calls are not missed; packet sessions are maintained; services work identically)

For the purposes of the present invention, the following abbreviations apply:
AMR Adaptive Multi-Rate
AS Access Stratum
BSS Base Station Subsystem
BSSGP Base Station System GPRS Protocol
BSSMAP Base Station System Management Application Part
CC Call Control
CGI Cell Global Identity
CM Connection Management
CN Core Network
CS Circuit Switched
CSR Circuit Switched Resources
CTM Cellular Text Telephone Modem
DNS Domain Name System
DTM Dual Transfer Mode
ETSI European Telecommunications Standards Institute
FQDN Fully Qualified Domain Name
GAD Geographical Area Description
GAN Generic Access Network
GERAN GSM EDGE Radio Access Network
GGSN Gateway GPRS Support Node
GMM/SM GPRS Mobility Management and Session Management
GPRS General Packet Radio Service
GSM Global System for Mobile communications
GSN GPRS Support Node
HLR Home Location Register
HPLMN Home PLMN
HSPA High Speed Packet Access
IETF Internet Engineering Task Force
IMEISV International Mobile station Equipment Identity and Software Version number
IMS IP Multimedia Subsystem
IMSI International Mobile Subscriber Identity
IP Internet Protocol
ISIM IMS Subscriber Identity Module
LA Location Area
LAI Location Area Identity
LLC Logical Link Control
LTE Long Term Evolution
MAC Medium Access Control
MM Mobility Management
MS Mobile Station
MSC Mobile Switching Center
MTP1 Message Transfer Part layer 1
MTP2 Message Transfer Part layer 2
MTP3 Message Transfer Part layer 3
NAS Non-Access Stratum
PDP Packet Data Protocol
PDU Protocol Data Unit
PLMN Public Land Mobile Network
PMSC Packet MSC
PSAP Public Safety Answering Point
NOTE: A PSAP is an emergency services network element that is responsible for answering emergency calls.
PSTN Public Switched Telephone Network
QoS Quality of Service
RA Routing Area
RAC Routing Area Code
RAI Routing Area Identity
RAT Radio Access Technology
RLC Radio Link Control
ROHC Robust Header Compression
RRC Radio Resource Control
RTCP Real Time Control Protocol
RTP Real Time Protocol
SCCP Signaling Connection Control Part
SGSN Serving GPRS Support Node
SIM Subscriber Identity Module
SMLC Serving Mobile Location Center
SMS Short Message Service
SNDCP Sub-Network Dependent Convergence Protocol
SS Signaling Subsystem
TFO Tandem Free Operation
TrFO Transcoder Free Operation
TTY Text Telephone or TeletYpewriter
UDP User Datagram Protocol
UMTS Universal Mobile Telecommunication System
VLR Visited Location Register
VPLMN Visited Public Land Mobile Network FIG. 1 illustrates a system 100 for providing circuit switched domain services over a packet switched network. Previously, a mobile station 110 using a long term evolution radio access 130 needed to access another network, e.g. 2G/3G network 120, in order to use MSC based CS domain services. The present invention allows a mobile station 110 to use the MSC based CS domain services also when on a long term evolution (LTE) network 130, or other packet based accesses is used. This invention description uses Third Generation Partnership Project (3GPP) accesses as example. It should be noted that other access types also is applicable to the invention, for example 3GPP2 and WiMax accesses. This means that all the control plane 180 and user plane 190 information for the CS domain, e.g., circuit switched core network CS CN 160, is tunneled through the 3GPP PS network 140. Services related to public switched telephone network (PSTN) 170 may also be accessed via CS CN 160.

Control plane information 180 is tunneled through packet switched network 140 to network controller 194. Network controller 194 may be a stand-alone unit or may be a component of mobile switching center server (MSC-S) 196. User plane information 190 is tunneled through packet switched network 140 to inter working unit (IWU) 192. IWU 192 may be a stand-alone unit or may be a component of circuit switch domain media gateway (CS-MGW) 198. Network controller 194, MSC-S 196, IWU 192, and CS-MGW 198 are all located in a packet mobile switching center (not shown).

All other possible PS traffic 182 would be transported towards packet data network 150. The figure shows LTE 130 as an example for the 3GPP PS access being used. Other possibilities are e.g. Evolved GSM/GPRS, UMTS/HSPA and WiMax. The LTE example of FIG. 1 also shows Access Gateway (AGW) 144. It should be noted that although the present invention refers to 3GPP accesses, those skilled in the art will realize that any packet based access may be utilized. AGW 144 is the node corresponding to the GGSN in the Evolved GSM/GPRS and UMTS/HSPA cases. In current standards (3GPP 23.401) the AGW consists of a Serving Gateway and a PDN Gateway (Packet Data Network Gateway).

Figure 2:
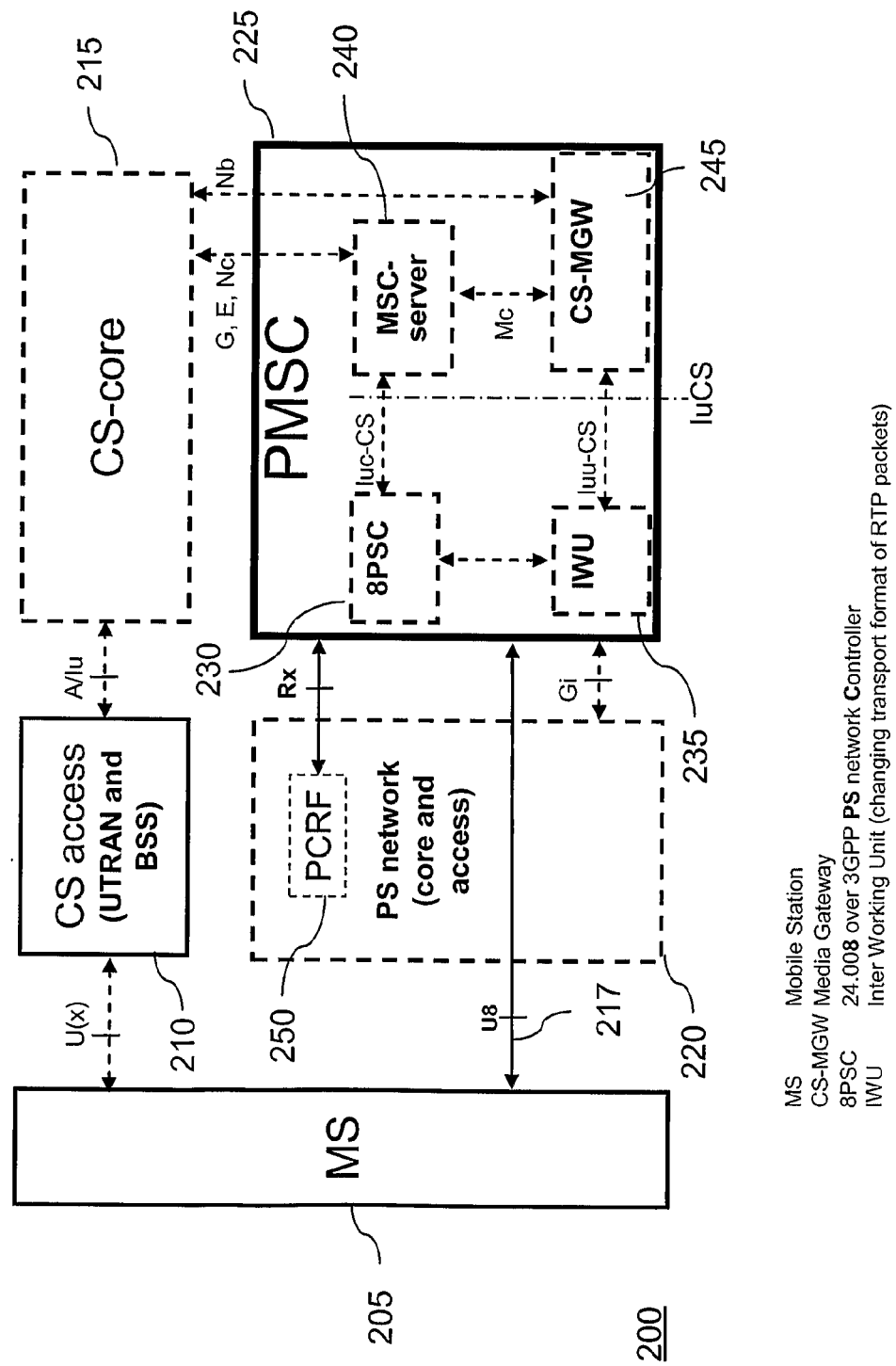
FIG. 2 illustrates a 24.008 over 3GPP PS network functional architecture according to one embodiment of the present invention.

FIG. 2 illustrates one embodiment of a 24.008 over 3GPP PS network functional architecture 200. Mobile station (MS) 205 contains functions to access the 24.008 over 3GPP packet switched (PS) network 220.

Packet mobile switching center (PMSC) 225 has new functionality as compared with a mobile switching center (MSC). PMSC 225 is able to handle the 24.008 over 3GPP PS network service. In one embodiment, PMSC 225 handles interface (U8) 217, which is an interface between mobile station 205 and PMSC 225 over PS network 220. In one embodiment, PMSC 225 is able to request certain IP Quality of service class from the PS network. PMSC 225 may be divided into 4 functional components: the MSC server 240, a network controller 230, e.g., 24.008 over 3GPP network Controller (8PSC), an Inter Working Unit (IWU) 235 and a media gateway 245, e.g., CS domain Media Gateway (CS-MGW). Network controller 230 and IWU 235 may be stand alone units or may be part of MSC-Server 240 and CS-MGW 245, respectively.

Network controller 194, 230 terminates the control plane part of the U8 interface (i.e. the U8c interface). Network controller 230 optionally authenticates the user, e.g., MS 205, before any signaling towards the Iu-CS interface is attempted. Network controller 230 is also responsible for requesting resources from Policy and Charging Rules Function (PCRF) 250.

IWU 192, 235 terminates the user plane part of the U8 interface (i.e. the U8u interface) and is responsible for repacking of the media stream from Real Time Protocol (RTP) to Nb (Nb is the interface between media gateways in the 3GPP CS domain) framing in RTP. Optionally, if an Asynchronous Transfer Mode (ATM) based interface on Iu-CS is used, IWU 235 will also do media gatewaying between ATM and IP.

In addition to handling control information from network controller 230, MSC server 240 operates to handle control information from a mobile station via CS-core 215 and CS access 210 and media control information, Mc, from CS-MGW 245 as detailed in related specifications of the 3GPP standard. In addition to handling user plane information from IWU 235, Circuit Switched domain Media Gateway (CS-MGW) 245 also operates to handle media information as detailed in related specifications of the 3GPP standard.

MS 205 interfaces to network 210 using Um for GERAN and Uu for UMTS Terrestrial Radio Access Network (UTRAN). The term U(x) is used to denote both Um and Uu without excluding even more interfaces.

The A and Iu interfaces are the two standard CS domain interfaces between Access Network 210 and Core Network 215. The A-interface is used between GERAN 210 and MSC 240 and the Iu-CS interface can be used either between GERAN 210 and MSC 240 or between UTRAN 210 and MSC 240.

The Rx interface is the interface used by applications towards PCRF 250. It is not foreseen that this application will have any additional functionality needs on the interface.

Interface 217, i.e., U8-interface, is divided on user plane U8u 180 and control plane U8c 190. Interface 217 carries all the control and user plane information needed to e.g. Rove; and set-up, maintain, and clear 24.008 CS calls over a 3GPP PS network, e.g. network 140, 220. U8-interface 217 is between the MS 110, 205 and the PMSC 225. The interface supports all CS defined services within 3GPP 24.008, such as mobility, basic call and supplementary services.

The Gi interface is the IP-based interface coming out from the 3GPP PS network. Another name for the Gi interface is SGi and is used in the SAE/LTE 3GPP specifications. On functional level there is no real difference between Gi and SGi. In one embodiment, the Gi interface (or the SGi) is implemented using AGW 144 (which can be broken up into S GW and PDN GW according to current standardization). In another embodiment using a GPRS PS network, the Gi interface is implemented using GGSN. In yet another embodiment using WiMAX, architecture the AGW can be translated into the Access Service Network Gateway and Home Agent. In the WiMAX architecture there are no name corresponding to the Gi and SGi reference points.

Figure 3:
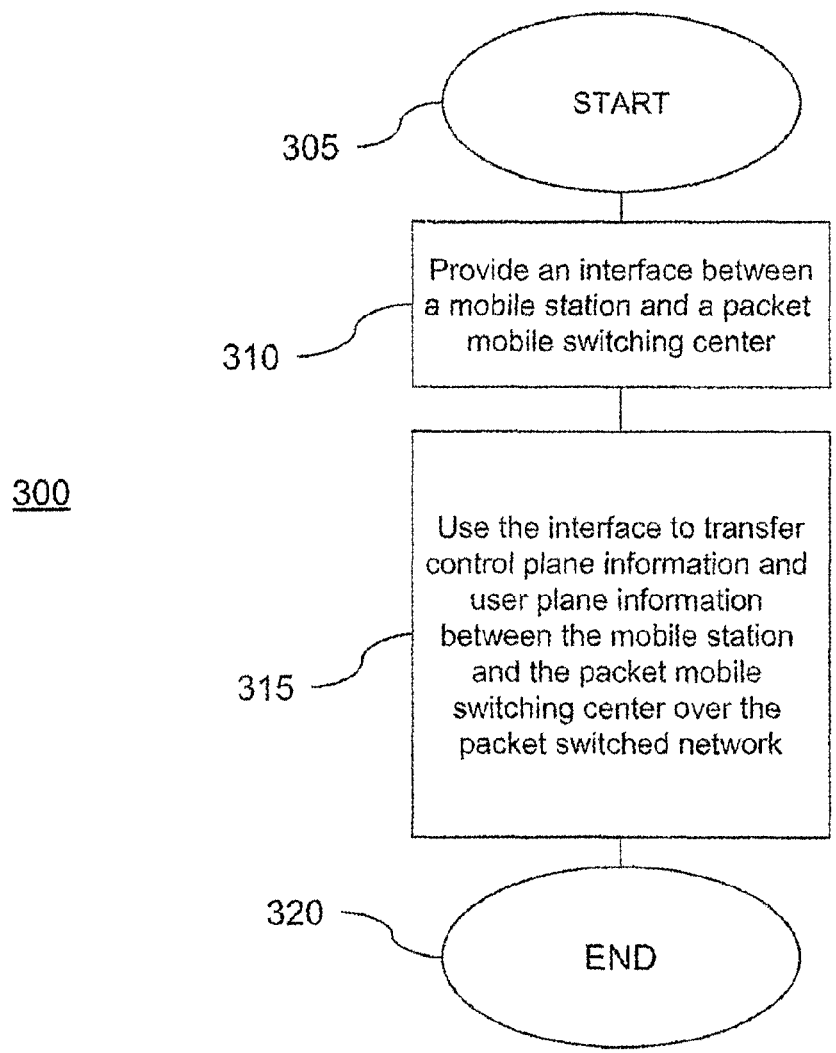
FIG. 3 illustrates a diagram of a method for providing MSC based CS domain service over a packet switched network according to one embodiment of the present invention.

FIG. 3 illustrates a diagram of a method for providing MSC based CS domain service over a packet switched network according to one embodiment. Method 300 starts at step 305 and proceeds to step 310. In step 310, an interface 217 between a mobile station and a packet mobile switching center is provided. In step 315, interface 217 is used to transfer control plane information and user plane information between the mobile station and the packet mobile switching center over the packet switched network.

Figure 4:
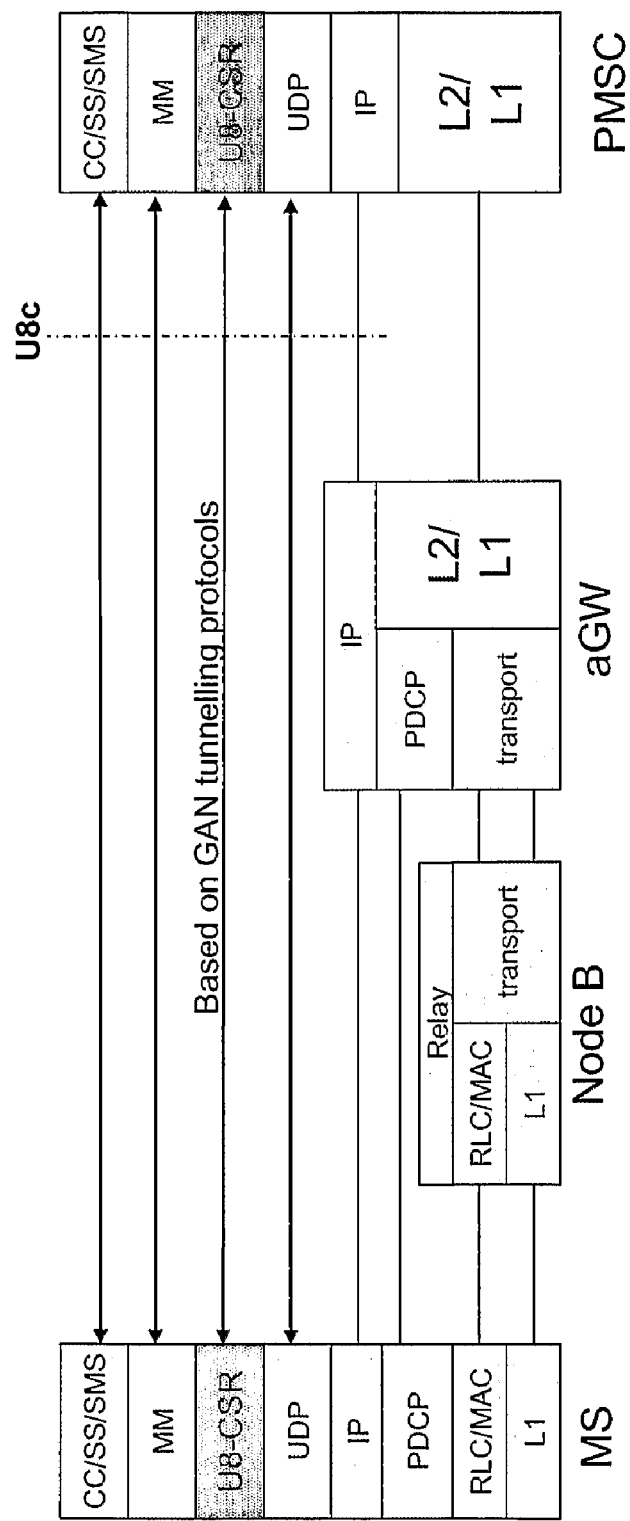
FIG. 4 illustrates a control plane PS network protocol architecture according to one embodiment of the present invention.

FIG. 4 illustrates a control plane PS network protocol architecture. One embodiment of a 24.008 over 3GPP PS network protocol architecture for the control plane in LTE is shown. In GPRS and UMTS the protocol stack will look very similar, however some different node entities exists.

The embodiment shown in FIG. 4 illustrates features of the U8c interface for the 24.008 over 3GPP PS network service. The 3GPP PS network provides the generic IP connectivity between the MS and the PMSC. In this embodiment, the PMSC is connected via the SGi/Gi-interface.

UDP provides transport for the U8 Circuit Switched Resources (U8-CSR) 217 between MS 110, 205 and PMSC 225. In one embodiment, U8-CSR is based on GAN (Generic Access Network) tunneling protocols as defined in 3GPP TS 43.318 and 44.318. The U8-CSR protocol manages the IP connection and performs functionality equivalent to the GSM-RR protocol. Protocols, such as mobility management (MM) and above, e.g., CC/SS/SMS, are carried transparently between MS 110, 205 and PMSC 225. The IP address of MS 110, 205 is used by PMSC 225 to communicate with the MS 110, 205 for the 24.008 over 3GPP PS network service.

Figure 5:
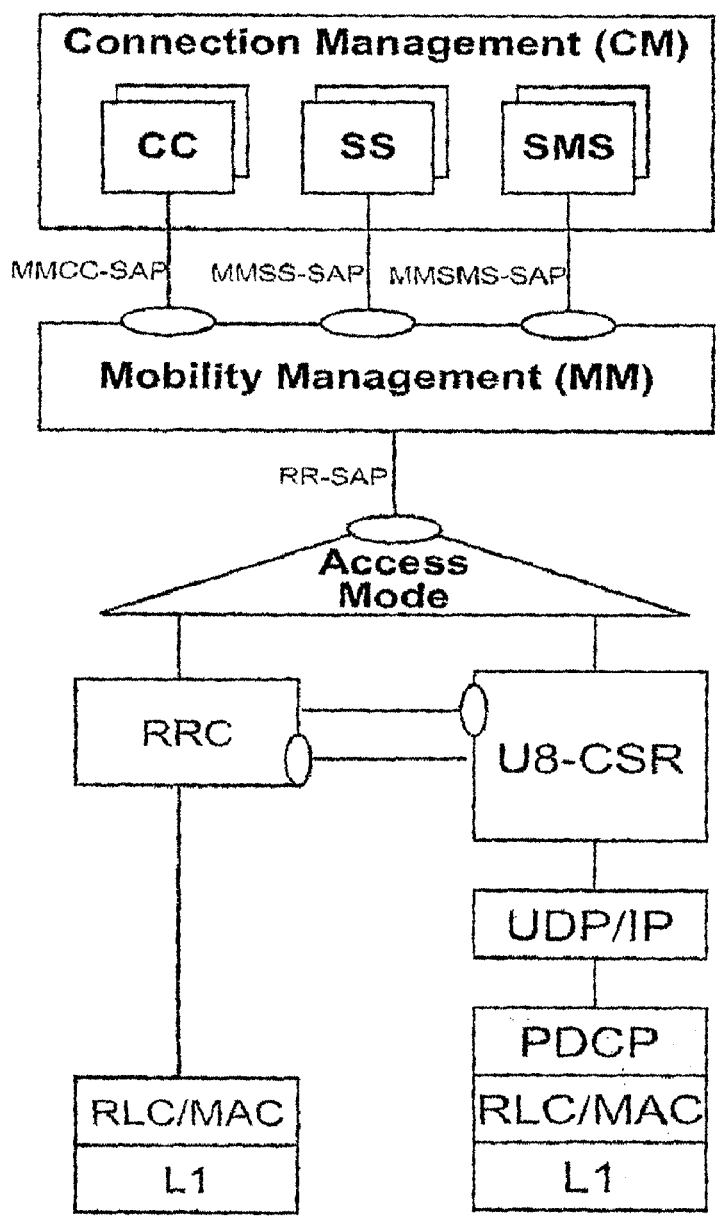
FIG. 5 illustrates MS architecture for the CS domain control plane according to one embodiment of the present invention.

FIG. 5 illustrates MS architecture for the CS domain control plane in MS 110, 205. A Connection Management (CM) layer comprises call control (CC), signaling subsystem (SS), and short message service (SMS) services. Mobility Management (MM) layer interfaces with CC, SS, and SMS services of the CM layer using corresponding service access points (SAPs). The Radio Resource SAP (RR-SAP) interface to the UMTS/GSM-MM layer is preserved identically for GSM, UMTS and 24.008 over 3GPP PS network (and for GAN if present) access. An access mode switch is provided to switch between UTRAN/GERAN and 24.008 over 3GPP PS network modes (and GAN if present). U8-CSR peers with UTRAN-RRC/GSM-RR to provide coordination for handover. Note: The RLC/MAC/L1 can be the same in some cases, e.g. in the UMTS CS and PS radio interfaces.

Figure 6:
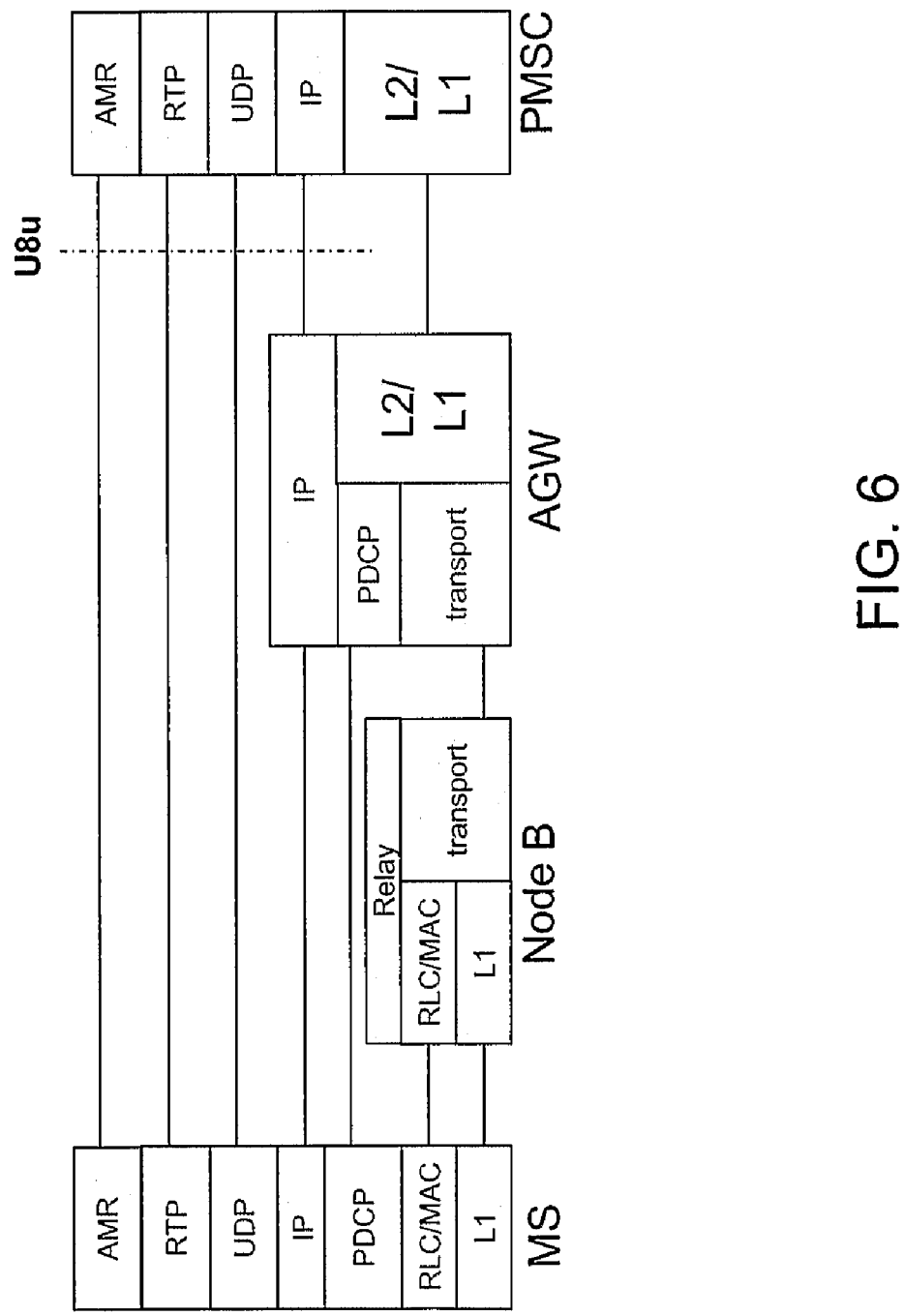
FIG. 6 illustrates a user plane PS network protocol architecture according to one embodiment of the present invention.

FIG. 6 illustrates a user plane PS network protocol architecture. The embodiment shown in FIG. 6 illustrates features of the U8u interface for the 24.008 over 3GPP PS network service. The 3GPP PS network provides the generic connectivity between the MS and the IP network. CS domain user plane is transported over RTP/UDP between MS and PMSC. Standard 3GPP codecs, e.g. AMR, as specified e.g. in 3GPP TS 26.071, are supported when operating in 24.008 over 3GPP PS network mode. CS-data is transported over RTP/UDP, by defining a new RTP frame format to carry the TAF (Terminal Adaptation Function)-TRAU (Transcoder and Rate Adaptation Unit) (V.110 like) frames over RTP TTY is transported using CTM over GSM codec over RTP/UDP. Header compression (such as ROHC) for efficient voice transport over the radio access network can optionally be supported by 3GPP PS access and PS core nodes.

The U8-CSR protocol provides a resource management layer, which is equivalent to the GSM-RR or UTRAN-RRC and provides the following functions: discovery, i.e. selecting the 24.008 over 3GPP PS network supporting PMSC; setup of IP bearer resources for CS service between the MS and PMSC (8PSC functional entity); handover support between UTRAN/GERAN and 24.008 over 3GPP PS network; and functions such as paging, ciphering configuration, classmark change, etc.

Figure 7:
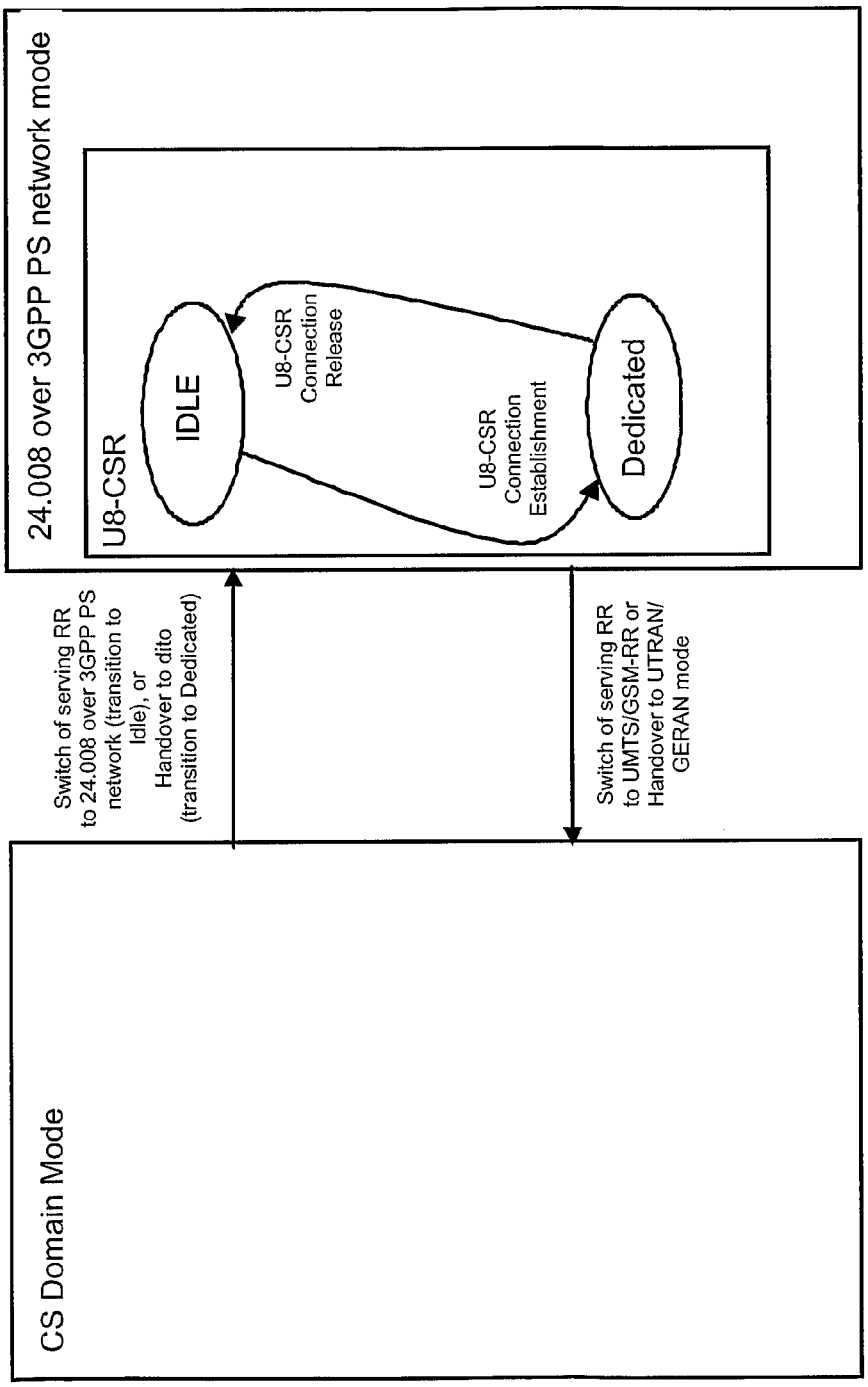
FIG. 7 illustrates a state diagram for an MS implementing the 24.008 over 3GPP PS network functionality according to one embodiment of the present invention.

FIG. 7 illustrates an exemplary state diagram for an MS implementing the 24.008 over 3GPP PS network mode. The U8-CSR sub-layer in the MS can be in two states U8-CSR-IDLE or U8-CSR-DEDICATED and moves between these states as defined below.

The MS enters 24.008 over PS network mode when the MS switches the serving RR entity to U8-CSR and the SAP between the MM and the U8-CSR is activated. While the MS remains in 24.008 over 3GPP PS network mode it performs normal and periodic Location Updates and application level keep-alive with the 24.008 over 3GPP PS network supporting PMSC.

The MS moves from the U8-CSR-IDLE state to the U8-CSR-DEDICATED state when the U8-CSR connection is established and returns to U8-CSR-IDLE state when the U8-CSR connection is released. Upon U8-CSR connection release an indication that no dedicated resources exist is passed to the upper layers.

The MS may also enter U8-CSR-DEDICATED state in 24.008 over PS network mode to from CS Domain mode when Handover to 24.008 over 3GPP PS network is being performed. In the same way, the MS enters CS Domain mode from U8-CSR-DEDICATED when Handover from 24.008 over 3GPP PS network.

The 24.008 over 3GPP PS network supports security mechanisms at different levels and interfaces. It is assumed that the 3GPP PS access is secure enough for the service (using the security mechanism specified for the PS service). Optionally IPsec (IPsec is used by IMS) may be utilized to secure the signaling. Authentication will be done on MM layer, and controlled by the PMSC (normal SIM and ISIM authentication procedures).

In addition, it may be desirable to provide security between the AGW and the PMSC. For example, the AGW resides in the HPLMN and the PMSC resides in the VPLMN in the roaming case and it might be appropriate to provide some low-level security (e.g. IPsec tunnels) for the traffic between the AGW and the PMSC.

What is claimed:

1. A Packet Mobile Switching Center, PMSC, for providing a circuit switched telecommunication service to a mobile station utilizing a Long Term Evolution, LTE, packet switched access network, said packet mobile switching center comprising:
   a network controller for receiving control plane information tunneled through a packet switched network from the LTE access network, and for requesting resources from a Policy and Charging Rules Function, PCRF, in the packet switched network;
   a Mobile Switching Center Server, MSC-S, in communication with the network controller for setting up sessions between the mobile station and a circuit switched core network;
   a Circuit Switched Media Gateway, CS-MGW, in communication with the MSC-S for forwarding a media stream to and from the circuit switched core network; and
   an interworking unit, IWU, in communication with the network controller and the CS-MGW for receiving user plane information tunneled through the packet switched network from the LTE access network, and for repacking the user plane information from Real Time Protocol, RTP, to Nb framing for use by the CS-MGW.

2. The PMSC as recited in claim 1, wherein the network controller includes means for requesting an Internet Protocol, IP, Quality of Service class from the PCRF in the packet switched network.

3. The PMSC as recited in claim 1, wherein the network controller is part of the MSC-S.

4. The PMSC as recited in claim 1, wherein the network controller includes means for authenticating a user before signaling towards an Iu-CS interface to the MSC-S is attempted.

5. The PMSC as recited in claim 1, wherein Asynchronous Transfer Mode, ATM, is utilized between the IWU and the CS-MGW, and the IWU includes means for media gatewaying between ATM and IP.

6. The PMSC as recited in claim 1, wherein the IWU is part of the CS-MGW.

7. A method in a Packet Mobile Switching Center, PMSC, for providing a circuit switched telecommunication service to a mobile station utilizing a Long Term Evolution, LTE, packet switched access network, said method comprising the steps of:
   receiving by a network controller, control plane information tunneled through a packet switched network from the LTE access network;
   requesting resources by the network controller, from a Policy and Charging Rules Function, PCRF, in the packet switched network;
   providing control information by the network controller to a Mobile Switching Center Server, MSC-S;
   setting up a session by the MSC-S between the mobile station and a circuit switched core network;
   receiving user plane information by an interworking unit, IWU, said user plane information including a media stream tunneled through the packet switched network from the LTE access network;
   repacking the media stream by the IWU, from Real Time Protocol, RTP, to Nb framing; and
   forwarding a media stream by the IWU to a Circuit Switched Media Gateway, CS-MGW, for transport to and from the circuit switched core network.

8. The method as recited in claim 7, further comprising requesting by the network controller, an Internet Protocol, IP, Quality of Service class from the PCRF in the packet switched network.

9. The method as recited in claim 7, further comprising authenticating a user by the network controller before signaling towards an Iu-CS interface to the MSC-S is attempted.

10. The method as recited in claim 7, wherein Asynchronous Transfer Mode, ATM, is utilized between the IWU and the CS-MGW, and the method further comprises media gatewaying between ATM and IP by the IWU.

11. A Packet Mobile Switching Center, PMSC, for providing a circuit switched telecommunication service to a mobile station utilizing a Worldwide Interoperability for Microwave Access, WiMAX, packet switched access network, said packet mobile switching center comprising:
- a network controller for receiving control plane information tunneled through a packet switched network from the WiMAX access network, and for requesting resources from a Policy and Charging Rules Function, PCRF, in the packet switched network;
- a Mobile Switching Center Server, MSC-S, in communication with the network controller for setting up sessions between the mobile station and a circuit switched core network;
- a Circuit Switched Media Gateway, CS-MGW, in communication with the MSC-S for forwarding a media stream to and from the circuit switched core network; and
- an interworking unit, IWU, in communication with the network controller and the CS-MGW for receiving user plane information tunneled through the packet switched network from the WiMAX access network, and for repacking the user plane information from Real Time Protocol, RTP, to Nb framing for use by the CS-MGW.

* * * * *

UNITED STATES PATENT AND TRADEMARK OFFICE
CERTIFICATE OF CORRECTION

PATENT NO. : 8,094,652 B2
APPLICATION NO. : 12/522403
DATED : January 10, 2012
INVENTOR(S) : Hallenstal et al.

Page 1 of 1

It is certified that error appears in the above-identified patent and that said Letters Patent is hereby corrected as shown below:

On Page 2, in Field (56), under "OTHER PUBLICATIONS", in Column 2, Line 2, delete "Hetworks" and insert -- Networks --, therefor.

In Column 8, Line 22, in Claim 4, delete "1u-CS" and insert -- Iu-CS --, therefor.

In Column 8, Line 60, in Claim 9, delete "1u-CS" and insert -- Iu-CS --, therefor.

Signed and Sealed this
Twentieth Day of March, 2012

David J. Kappos
*Director of the United States Patent and Trademark Office*